United States Patent [19]
Araki

[11] Patent Number: 5,960,923
[45] Date of Patent: Oct. 5, 1999

[54] HYDRAULIC CLUTCH WITH WAVE SPRING

[75] Inventor: Masuo Araki, Neyagawa, Japan

[73] Assignee: Exedy Corporation, Osaka, Japan

[21] Appl. No.: 08/985,864

[22] Filed: Dec. 5, 1997

[30] Foreign Application Priority Data

Dec. 27, 1996 [JP] Japan .................................... 8-356601

[51] Int. Cl.[6] .............................................. F16D 25/0638
[52] U.S. Cl. ................................ 192/85 AA; 192/109 A; 267/163
[58] Field of Search ........................ 192/70.28, 85 AA, 192/109 A, 109 F; 188/72.3, 72.6; 267/161, 163

[56] References Cited

U.S. PATENT DOCUMENTS 3,285,379  11/1966  Helquist .......................... 192/109 A X
3,858,698  1/1975   Hause ............................. 192/70.28 X

FOREIGN PATENT DOCUMENTS 35 45 842 A1  1/1987  Germany ........................... 192/85 AA
5-141435      6/1993  Japan ............................... 192/70.28
6-17842       1/1994  Japan ............................... 192/70.28

Primary Examiner—Richard M. Lorence
Attorney, Agent, or Firm—Flynn, Thiel, Boutell & Tanis, P.C.

[57] ABSTRACT

A hydraulic clutch is made up of alternatively arranged discs and driven plates in a clutch drum which is actuated by a hydraulic piston and a wave spring for reducing a shock made of a strip formed into a ring and having pawls at both ends thereof extending in an axial or radial direction of the ring. The pawls engage with grooves in the hydraulic piston or the spline for mounting the driven plates, thereby preventing the wave spring from rotating with the clutch plates and the piston surface from wear or abrasion.

6 Claims, 5 Drawing Sheets

HYDRAULIC CLUTCH WITH WAVE SPRING

BACKGROUND OF THE INVENTION

1. Field of the Invention

The present invention relates to a hydraulic clutch for use in a vehicular automatic transmission or the like. Particularly, the invention is concerned with an improvement of a wave spring in a hydraulic clutch which wave spring is disposed between a hydraulic piston for engagement of a multiple disc clutch and a friction element such as a clutch plate to cushion a shock generated upon engagement of the clutch.

2. Description of the Prior Art

Heretofore, there has been known well a fluid type automatic transmission of the structure in which a friction engaging device such as a clutch or a brake is selectively engaged or released according to vehicular running conditions by means of a hydraulic control unit, whereby the power of an input shaft is transmitted to an output shaft while changing the change gear ratio through an auxiliary speed change mechanism such as a planetary gear for example.

A hydraulic clutch which constitutes part of such a friction engaging device will now be described with reference to FIGS. 7 and 8 in connection with such prior art as described in Japanese Utility Model Laid Open No. 68631/91 for example. The hydraulic clutch comprises a drive-side clutch drum 01, clutch plates 02 splined to the inside of the clutch drum, multiple-disc type clutch discs 03 splined to a driven-side clutch hub (not shown) and arranged alternately with the clutch plate 02, and a clutch piston 04 for engaging or releasing the clutch plates 02 and clutch discs 03.

When a clutch oil pressure is introduced into a hydraulic oil chamber 06 of the clutch piston 04, the clutch piston operates to engage the clutch, while upon relief of the oil pressure the clutch piston 04 is pushed back by a return spring (not shown) to release the clutch.

In this type of a hydraulic clutch, a dish plate 07 is usually disposed between a pressing surface 05 of the clutch piston 04 and the clutch plate 02 located at the frontmost position to cushion the shock generated upon engagement of the clutch. The reference numeral 08 in the figure denotes a return spring retainer.

The known dish plate 07 is generally of such a construction as shown in FIG. 8. For example, the dish plate 07 is fabricated by cutting out a ring-shaped plate portion 09 from a flat plate and then machining it into a dish-like form. Therefore, the yield from the flat plate is poor, resulting in that the component in question becomes expensive despite the simple structure thereof.

For solving the above-mentioned problem it is suggested to substitute the above dish plate by a so-called wave spring. The wave spring is fabricated by forming a single elongated strip-like spring material into a ring shape with use of a roll and at the same time waving the ring in its circumferential direction. A shock induced by engagement of the clutch upon operation of the clutch piston is cushioned by deformation of such a ring-like wavy spring.

However, since this wave spring comprises a ring-like spring member having certain width and thickness and an arbitrary number of wavy portions (portions bent in the rotating axis direction) in the circumferential direction, one of upper and lower peaks of each wavy portion of the wave spring contacts the working surface 05 of the clutch piston 04, while the other peak contacts the surface of the frontmost clutch plate 02. These contacts assume a so-called linear contact at the time of release of the clutch or at the beginning of engagement of the clutch. With movement of the clutch piston 04, the spacing between both contacts becomes narrower, and the shock induced upon engagement of the clutch is cushioned by a compressive deformation of the wave spring.

However, even such a wave spring involves a drawback. More particularly, when the clutch is released, the dish plate and the wave spring generally create a so-called co-rotation with rotation of the clutch plate which is rotating continually. Unlike the contact throughout the whole surface like the dish plate, the contact between each peak of the wave spring and the surface of the clutch plate or the clutch piston is generally a linear contact as mentioned above, so the co-rotation of the wave spring occurs while a wave peak of the wave spring is in sliding contact with the working surface of the clutch piston which is off.

In the case where the working surface is an iron surface as in the conventional clutch piston, there occurs no special inconvenience even upon rotation in sliding contact between a wave peak of the wave spring and the working surface. However, in the case where the working surface is of a soft material as in an aluminum clutch piston for example, there occurs a marked wear on the working surface of the clutch piston due to friction caused by a wave peak of the wave spring.

SUMMARY OF THE INVENTION

The present invention provides a wave spring having a novel rotation preventing means capable of eliminating the above-mentioned drawback and also provides a hydraulic clutch equipped with such a wave spring.

The hydraulic clutch according to the present invention is of the type in which plural disc assemblies and plural driven plates, which are arranged in an alternate manner, are clamped through a wave spring by means of a hydraulic piston, the wave spring having rotation preventing pawls at both ends of the ring.

DETAILED DESCRIPTION OF PREFERRED EMBODIMENTS

First Embodiment

Figure 1:
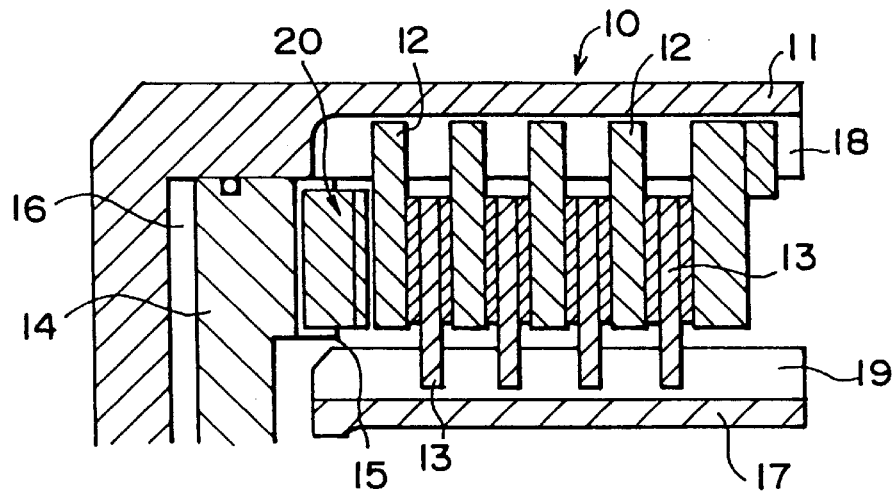
FIG. 1 is a partial sectional view of a clutch according to a first embodiment of the present invention.

FIG. 1 schematically illustrates the section of a principal portion of multiple disc clutch 10 provided with a wave spring 20 which is a characteristic element in the present invention. In the multiple disc clutch 10, which is substantially the same as the conventional like clutch, a large number of driven plates 12 are set in a spline shaft 18 provided on the inner peripheral surface of a clutch drum 11. Likewise, a large number of disc assemblies 13 are set to a spline shaft 19 of a clutch hub 17. These plates are pressed with a working surface 15 by virtue of a pressure oil introduced into a pressure oil chamber 16 of a clutch piston 14 and are thereby clamped together through the wave spring 20.

Figure 2A:
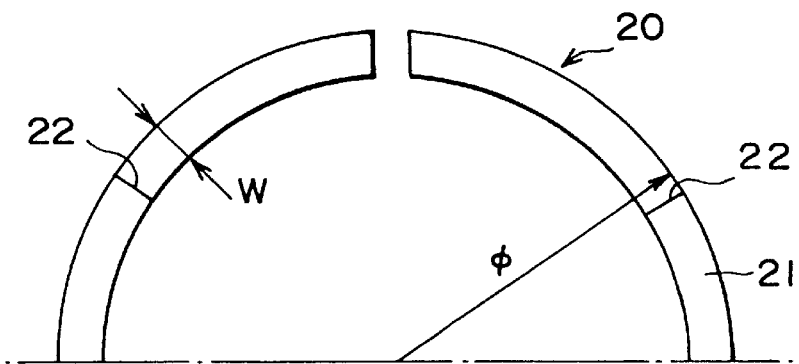
FIGS. 2(A) and (B) are a plan view and a side view of a half of a wave spring having retaining pawl portions which are bent in a rotating axis direction of the clutch.

FIG. 2 illustrates a plane (A) and a section (B) view of a semicircular portion of the wave spring 20 which is a characteristic element in the present invention.

The wave spring 20 is fabricated in the following manner. Using a roll, an elongated strip is bent into a ring shape in conformity with the size of a clutch to which the wave spring is applied. At the same time, the ring thus formed and indicated at 21 is bent in the rotating axis direction at arbitrary positions 22 on its circumference and is cut such that a ring is substantially formed, whereby the ring 21 is made wavy in side view. There may be selected a desired number of peaks (or troughs) 22 of the waves.

For example, in the illustrated embodiment, the outer diameter ($\phi$) of the wave spring is 117.55 mm and the width (W) of the ring-like portion is 7.5 mm. The number of peaks (both sides thereof are troughs) is four, which number, however, may be selected arbitrarily. Further, the thickness of the wave spring in a free condition is set at H=3 mm, but in a compressed state of the clutch the said thickness is compressed to 1.8 mm or so corresponding to the thickness of the wave spring. This is substantially the same as in the case of the conventional dish plate.

Figure 2B:
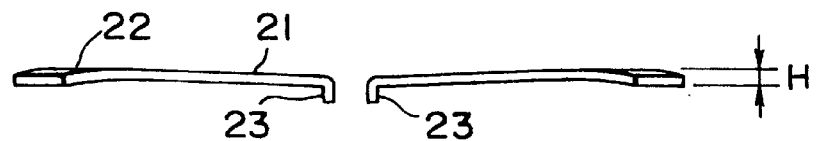
Figure 3:
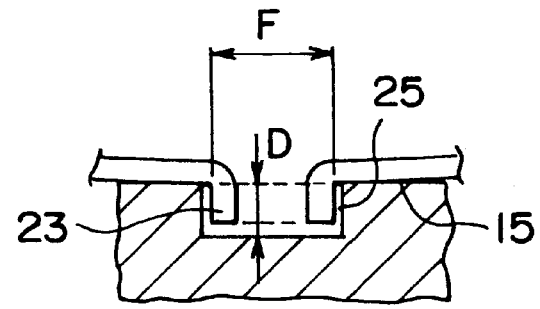
FIG. 3 is an explanatory view of the first embodiment in FIG. 2 showing an engaged state between the retaining pawl portions of the wave spring and a groove formed in a working surface of a piston.

The rotation preventing pawls of the wave spring 20 as a characteristic element in this embodiment is illustrated in FIGS. 2 and 3.

FIG. 3 shows a retaining groove 25 formed radially in the working surface 15 of the piston used in the clutch. On the other hand, the bent pawl portions 23 formed at both ends of the wave spring 21 shown in FIG. 2(B) are spaced from each other at a distance of say F=8.0 mm. The pawl portions 23 are a little shorter than the depth D (=3.0 mm) of the groove 25 formed in the working surface 15 of the piston.

Thus, the bent pawl portions of the wave spring 21 are always fitted and engaged in the groove 25 formed in the working surface of the piston, so that even in a released state of the clutch the rotation of the wave spring can be prevented easily and hence it is possible to prevent wear of the working surface of the piston.

Second Embodiment

Figure 4:
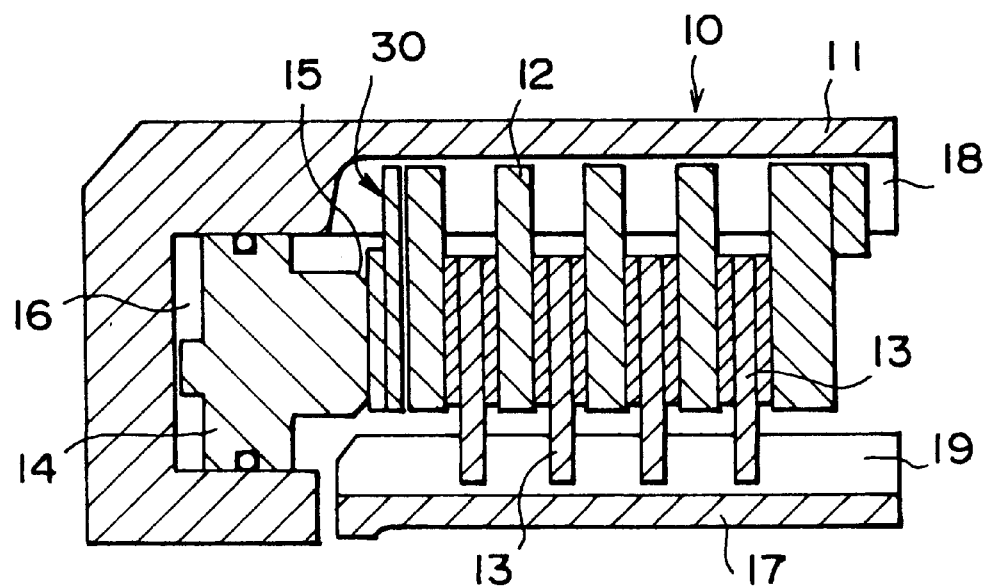
FIG. 4 is a partial sectional view of a clutch according to a second embodiment of the present invention.
Figure 5A:
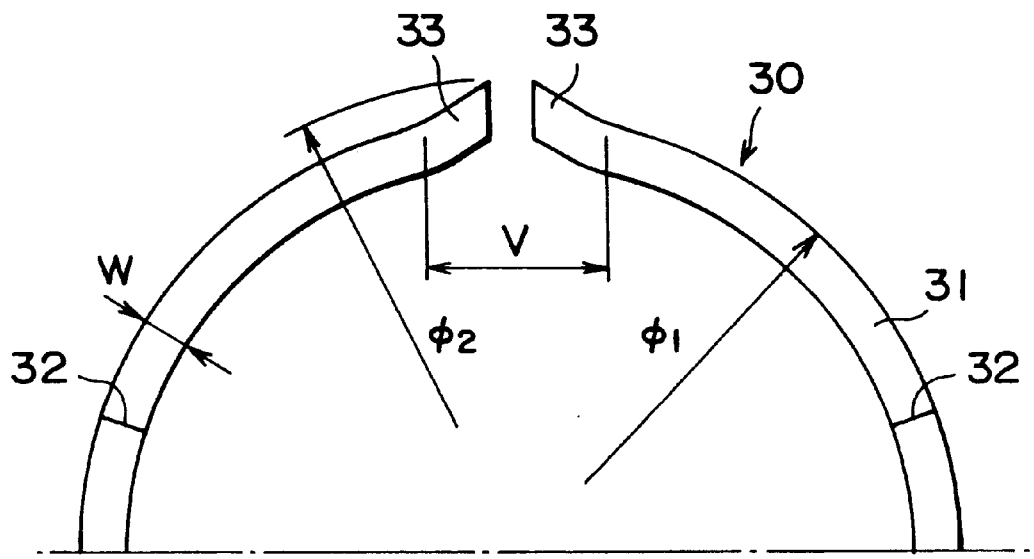
FIGS. 5(A) and (B) are a plan view and a side view of a half of a wave spring having retaining pawl portions which are bent circumferentially outward of the clutch.
Figure 5B:
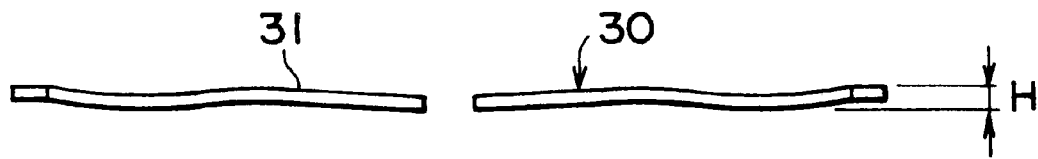
Figure 6A:
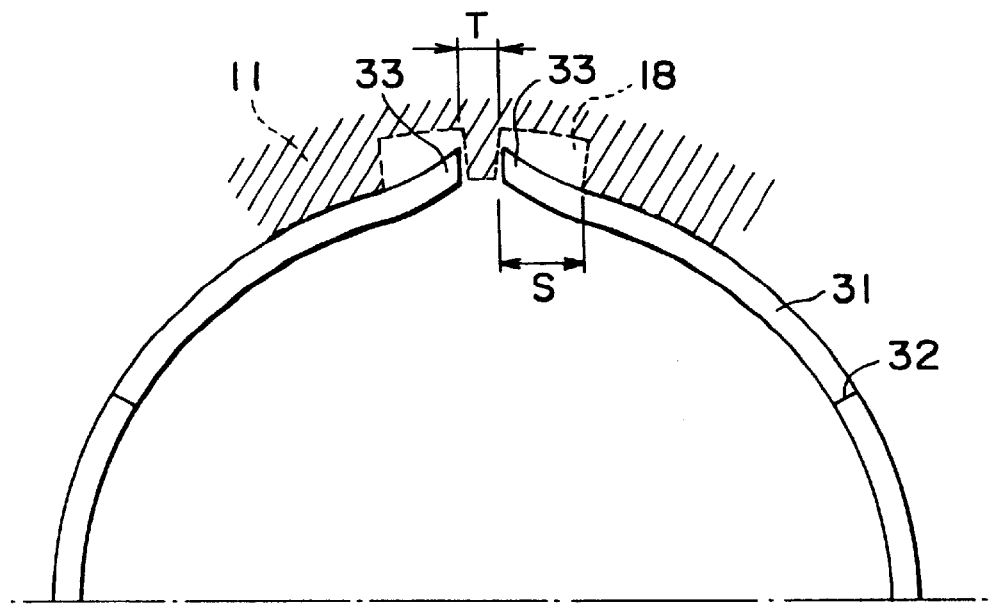
FIGS. 6(A) and (B) are explanatory diagrams showing respectively a properly mounted state and an improperly mounted state of the retaining pawl portions of the wave spring in the second embodiment.

FIGS. 4 to 6 illustrate a second embodiment of the present invention. Like the wave spring used in the first embodiment, a wave spring 30 used in the second embodiment is fabricated in the following manner. Using a roll, an elongated strip is subjected to bending and at the same time its circumferential surface is bent in the rotating axis direction at arbitrary positions, then the thus-bent strip is cut at a terminal position of substantially one circumference, whereby the strip is formed into a ring shape having an outer diameter ($\phi_1$) of say 129.5 mm and having four to six peaks (and troughs) 32. Also in the same manner as in the first embodiment, the peaks and troughs are connected together by circular arcs of a large radius of curvature to form waves throughout the whole. In this embodiment, the outer diameter ($\phi_1$) of the ring portion indicated at 31 is set at 129.5 mm, the width W thereof is set at 7.0 mm, and a free-state thickness (H) of the entire wave spring is set at 2.6 mm. The plate thickness of the spring is about 1.8 mm. However, it should be readily clear that also in this embodiment the sizes of various portions are not limited to the above numerical values.

A feature of this embodiment resides in that both end portions of the wave spring ring 31 are bent radially outward to form retaining pawl portions 33. As is apparent from FIG. 6(A), the retaining pawl portions 33 are fitted in one of many splines for the mounting of driven plates, which splines are usually provided on the inner wall of the clutch drum, to prevent rotation of the wave spring ring 31. In the illustrated embodiment, each spline disposed on the inner wall of the clutch drum has a central partitioning projection 40 and has groove portions 18 formed on both sides of the projection 40, provided the partitioning projection 40 is not always needed in exhibiting the expected effect.

In the spline formed on the inner wall of the clutch drum used in this embodiment, both grooves 18, 18 are each 13.0 mm in width (S), and the width (T) of a base portion of the central partitioning projection 40 is 6.0 mm. As shown in FIG. 5, the retaining pawl portions 33 are formed by bending, for example at positions of V=27.0 mm, both end portions of the spring up to a position of $\phi_2$=140 mm. In this embodiment, therefore, as is apparent from FIG. 6(A), once the wave spring 31 is mounted properly between the driven plates and the working surface of the piston, the retaining pawls 33 at both ends are fitted in the spline 18 of the clutch drum in a sandwiching relation to the central partitioning wall 40. The shape of the pawl portions 33 is not limited to the one used in this embodiment. Various shapes may be adopted in conformity with the groove shape of the spline.

Figure 6B:
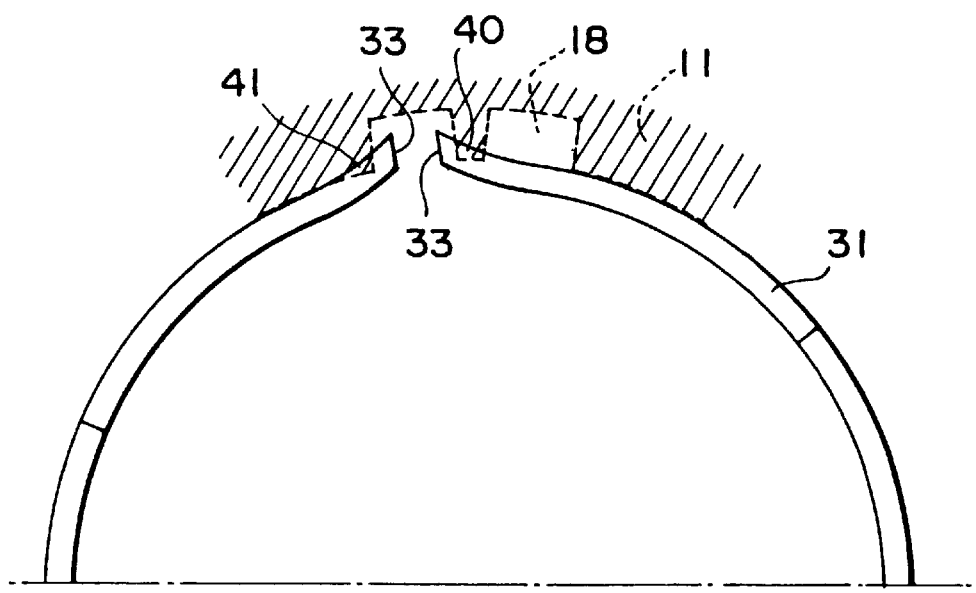
Figure 7:
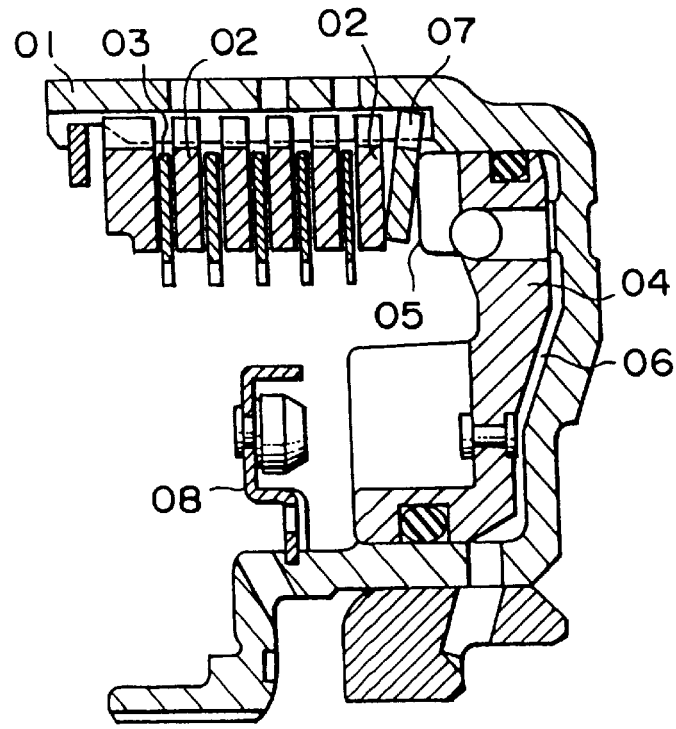
FIG. 7 is a partial sectional view of a conventional clutch having a dish plate.
Figure 8A:
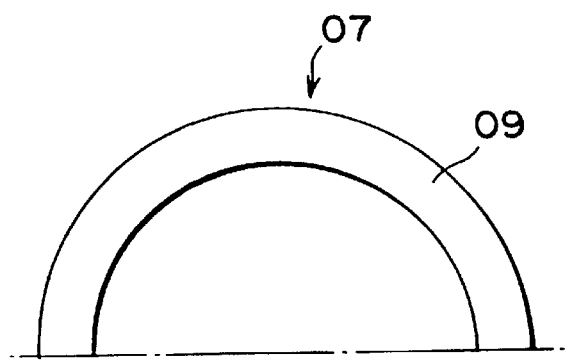
FIGS. 8(A) and (B) are a plan view and a side view of a half of the dish plate.
Figure 8B:

In contrast therewith, FIG. 6(B) shows a state in which the wave spring cannot be mounted properly within the spline of the clutch drum. As is seen from the same figure, if the retaining pawl portions 33 of the wave spring 31 deviate from their position from the spline 18, one retaining pawl strikes against a side wall portion 41 of the spline and the other retaining pawl strikes against the central partitioning wall 40, thus making the mounting of the wave spring impossible. In this way it is possible to easily prevent an erroneous mounting of the wave spring.

According to the present invention, as set forth above, the wave spring is engaged with the groove formed in the working surface of the piston of the clutch or with the spline formed on the inner periphery of the clutch drum by merely forming retaining pawl portions at both end portions of the wave spring ring, whereby the co-rotation thereof with the clutch plate can be prevented easily.

In the wave spring wherein the retaining pawl portions are formed radially outwards from the end portions of the wave spring ring, the pawls can be brought into engagement with the spline for the driven plate in the conventional clutch drum, so it is possible to prevent rotation of the wave spring ring in an extremely simple manner without the need of any special machining for the other portions of the clutch. Besides, the mounting of the wave spring is also very easy and it is possible to easily prevent wear of the working surface of the piston caused by a spring which is used for cushioning a shock induced at the time of engagement of the clutch.

What is claimed is:

1. A hydraulic clutch comprising a clutch drum, a shaft having a plurality of splines provided therein and disposed at an inner peripheral surface of the clutch drum, a plurality of driven plates mounted in the splines, a clutch hub, a plurality of discs mounted in the clutch hub and arranged alternatingly between the plurality of driven plates, a hydraulic piston and a wave spring provided between the hydraulic piston and the driven plates, the wave spring being formed by bending a strip of material into an annular configuration with a gap provided between the ends thereof and having rotation prevention pawls provided at each of the ends thereof.

2. The hydraulic clutch according to claim 1, wherein said rotation prevention pawls are formed by bending the ends of the wave spring in an axial direction of said wave spring and said rotation prevention pawls engage in a groove provided in the hydraulic piston.

3. The hydraulic clutch according to claim 1, wherein said rotation prevention pawls are formed by bending the ends of the wave spring in a radial direction of said wave spring and said rotation prevention pawls engage with one of the splines.

4. The hydraulic clutch according to claim 1, wherein the rotation prevention pawls engage with a projection provided in the center of the spline.

5. A wave spring formed by bending a strip of material into an annular configuration with a gap provided between the ends thereof, said wave spring having rotation prevention pawls formed at each end thereof by bending the ends of the wave spring in an axial direction of said wave spring.

6. A wave spring formed by bending a strip of material into an annular configuration with a gap provided between the ends thereof, said wave spring having rotation prevention pawls formed at each end thereof by bending the ends of the wave spring in a radial direction of said wave spring.

* * * * *

UNITED STATES PATENT AND TRADEMARK OFFICE
CERTIFICATE OF CORRECTION

PATENT NO. : 5,960,923
DATED : October 5, 1999
INVENTOR(S) : Masuo Araki

It is certified that error appears in the above-identified patent and that said Letters Patent is hereby corrected as shown below:

Column 6; line 4, change "claim 1" to ---claim 3---.

Signed and Sealed this

Twenty-third Day of January, 2001

Attest:

Q. TODD DICKINSON

*Attesting Officer*  *Commissioner of Patents and Trademarks*